Feb. 28, 1950 H. J. WEYER 2,498,833
FERTILIZER SPREADING MACHINE
Filed Oct. 25, 1946 2 Sheets-Sheet 1
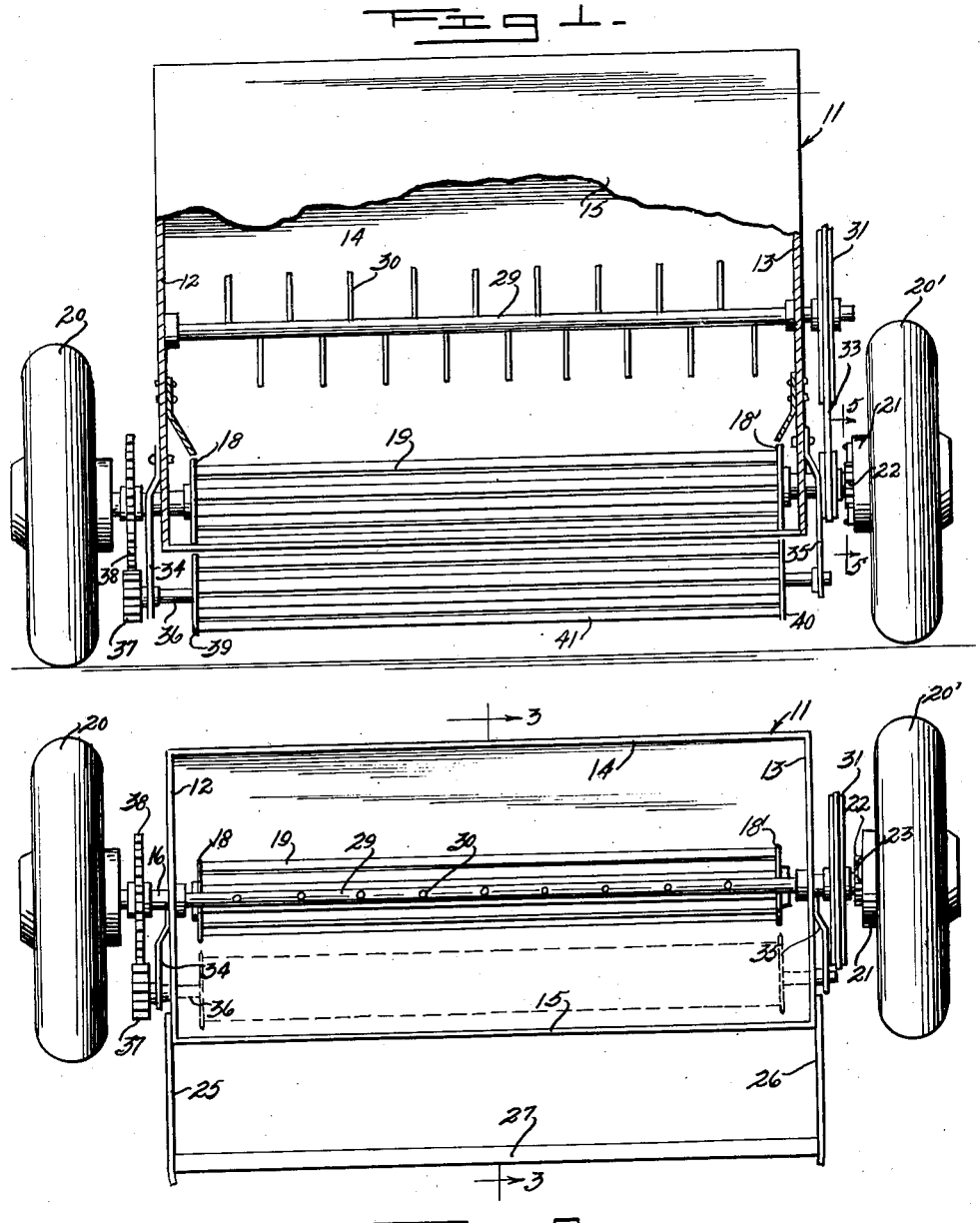
Inventor
Henry J. Weyer Feb. 28, 1950 H. J. WEYER 2,498,833
FERTILIZER SPREADING MACHINE
Filed Oct. 25, 1946 2 Sheets-Sheet 2
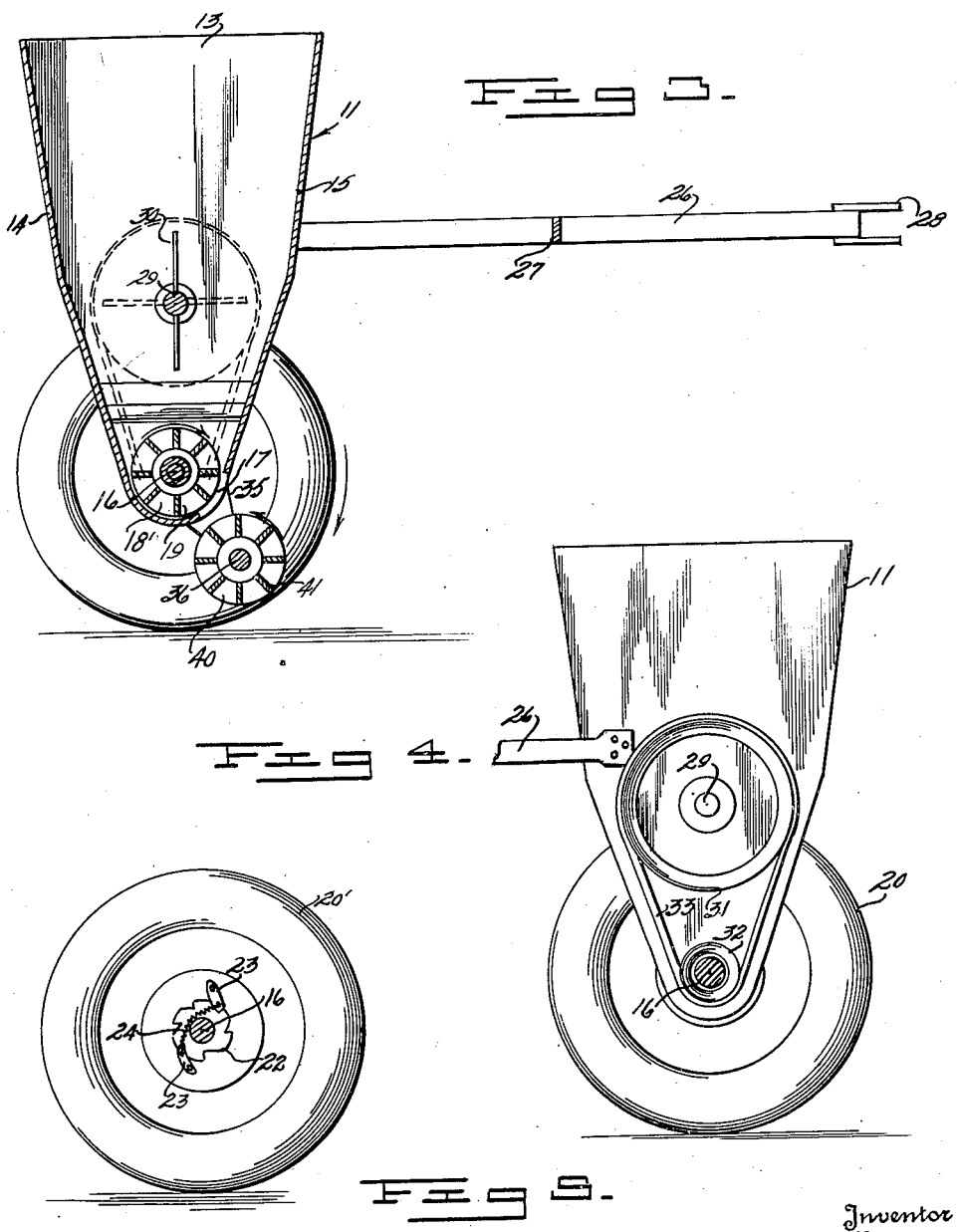
Inventor
Henry J. Weyer
By McMorrow, Berman & Davidson
Attorneys Patented Feb. 28, 1950

2,498,833

UNITED STATES PATENT OFFICE 2,498,833

FERTILIZER SPREADING MACHINE

Henry J. Weyer, Inglewood, Calif.

Application October 25, 1946, Serial No. 705,643

2 Claims. (Cl. 275—2)

This invention relates to scattering unloaders, and more particularly to a machine for spreading fertilizer.

A main object of the invention is to provide a novel and improved fertilizer spreading machine which is simple in construction, easy to operate and efficient in performance.

A further object of the invention is to provide an improved machine for scattering fertilizer on lawns and in similar areas, said machine being inexpensive to manufacture, compact in size and providing a uniform spreading of the fertilizer over the area traversed thereby.

Further objects and advantages of the invention will become apparent from the following description and claims, and from the accompanying drawings, wherein:

Figure 1 is a front elevational view, partly in cross-section, of a fertilizer spreading machine constructed in accordance with the present invention.

Figure 2 is a top plan view of the fertilizer spreading machine of Figure 1.

Figure 3 is a vertical longitudinal cross-sectional view taken on line 3—3 of Figure 2.

Figure 4 is a side elevational view of the main body portion of the machine of Figure 1.

Figure 5 is a detail cross-sectional view taken on line 5—5 of Figure 1.

Referring to the drawings, 11 designates a generally trough-shaped hopper having side walls 12, 13, a rear wall 14 and a front wall 15. Journalled in the lower portions of side walls 12 and 13 is a shaft 16.

The lower portions of walls 14 and 15 are downwardly tapered and the lower end of wall 15 is open at 17 to define a forwardly facing outlet opening at the bottom of the hopper extending substantially from side wall 12 to side wall 13. Rigidly mounted on shaft 16 are opposed discs 18, 18' and secured to said discs parallel to and radially spaced from shaft 16 are a plurality of radial agitator blades 19 which function to break up lumps of fertilizer in the bottom of hopper 11 and to propel them out of opening 17 responsive to rotation of shaft 16.

Rotatably mounted on the ends of shaft 16 are ground-engaging wheels 20, 20'. Rigidly secured to shaft 16 adjacent the inner hub portion 21 of wheel 20' is a ratchet disc 22. Pivotally secured to hub portion 21 are a pair of diametrically opposed pawl members 23, 23 adapted to engage the teeth of ratchet disc 22 and biased towards engaging positions therewith by a spring 24 which yieldably connects the free ends of the pawl members together. When the machine is moved forwardly pawls 23, 23 engage the teeth of ratchet disc 22 and cause shaft 16 to rotate. When the machine is moved rearwardly, the pawls slip past the teeth on the ratchet disc and shaft 16 remains stationary.

Secured to the side walls 12 and 13 are respective forwardly extending bars 25 and 26 connected by a cross bar 27 and joined together at their forward ends by a handle structure 28. By pulling on handle 28 the machine is moved forwardly and by pushing on said handle the machine is moved rearwardly.

Journalled in side walls 12 and 13 above and parallel to shaft 16 is a shaft 29 carrying a plurality of radial teeth 30 arranged in staggered rows on shaft 29. Secured to one end of shaft 29 is a relatively large pulley 31. Secured on shaft 16 in alignment with pulley 31 is a relatively small pulley 32. A belt 33 couples pulley 31 to pulley 32, so that shaft 29 rotates with shaft 16 but at a slower rate.

Secured to the lower portions of side walls 12 and 13 are a pair of forwardly and downwardly extending bracket bars 34 and 35. Journalled in the lower end portions of bracket bars 34 and 35 is a shaft 36 which extends parallel to shaft 16. Rigidly secured to one end of shaft 36 is a relatively small gear 37. Gear 37 meshes with a relatively large gear 38 which is rigidly secured to shaft 16. Shaft 36 thus rotates with shaft 16 but at a greater speed and in an opposite direction.

Secured to shaft 36 are discs 39 and 40 and secured to said discs are a plurality of radial agitator and distributor blades 41 which are parallel to and radially spaced from shaft 36.

In operation, fertilizer such as manure or the like is placed in hopper 11 and the machine is moved forwardly over the area to be fertilized by pulling on handle 28. The larger lumps of fertilizer are broken up by teeth 30 on shaft 29 which rotates at a relatively slow rate. The fertilizer is further broken up by agitator blades 19 on shaft 16 which rotates at the same speed as wheels 20, 20'. Blades 19 also propel the fertilizer out through opening 17 onto the blades 41 on shaft 36 which rotates at a faster rate than shaft 16 and causes the fertilizer to be still further pulverized and at the same time distributes it evenly onto the ground behind the machine.

Although the specific embodiment illustrated herein shows the distributing action as occurring rearwardly of the machine as it is pulled forward, by reversing the ratchet disc 22 and the pawl members 23, 23, the direction of distribution of the machine may be reversed, and it may be thus arranged to function responsive to pushing handle 28 instead of pulling thereon within the spirit of the present invention.

While a specific embodiment of a fertilizer distributing machine has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A fertilizer distributing machine comprising a hopper, a first shaft journalled in said hopper adjacent the bottom thereof, a second shaft journalled in said hopper above said first shaft, a relatively small pulley on said first shaft, a relatively large pulley on said second shaft, a belt coupling said pulleys, a plurality of agitating blades secured to said first shaft, a plurality of agitating teeth secured to said second shaft, a pair of ground-engaging wheels journalled on said first shaft, means for transmitting rotation of said wheels to said first shaft responsive only to forward rotation of said wheels, said hopper being formed with a discharge opening adjacent said blades of said first shaft, support means extending downwardly from said hopper adjacent said discharge opening, a third shaft journalled in said support means beneath said discharge opening, a plurality of agitating and distributor blades on said third shaft, a relatively small gear on said third shaft, and a relatively large gear on said first shaft, said gears being in mesh.

2. A fertilizer distributor comprising a hopper formed with a discharge opening in the bottom thereof, a first shaft journaled in said hopper adjacent said opening, a plurality of agitating blades on said shaft, a second shaft journaled in said hopper above said first shaft and operatively connected thereto, agitating teeth on said latter shaft, ground engaging wheels journaled on said first shaft, means for transmitting rotation of said wheels to said first shaft responsive only to rotation of said wheels in one direction, a third shaft journaled beneath said discharge opening, agitating and distributor blades on said third shaft, and a driving gear connection between said third shaft and said first shaft for rotating said distributor blades at a speed greater than the speed of said first shaft.

HENRY J. WEYER.

REFERENCES CITED

The following references are of record in the file of this patent:

UNITED STATES PATENTS

| Number | Name | Date |
|---|---|---|
| 55,470 | Cook | June 12, 1866 |
| 261,627 | Philpot | July 25, 1882 |
| 1,139,483 | Brown | May 18, 1915 |
| 1,876,409 | Gordon | Sept. 6, 1932 |
| 1,888,821 | Fearn | Nov. 22, 1932 |
| 2,350,107 | Gandrud | May 30, 1944 |

FOREIGN PATENTS

| Number | Country | Date |
|---|---|---|
| 262,005 | Italy | Jan. 3, 1929 |